No. 660,256. Patented Oct. 23, 1900.
J. G. LAMB.
THILL OR POLE COUPLING FOR VEHICLES.
(Application filed Jan. 20, 1900.)
(No Model.)
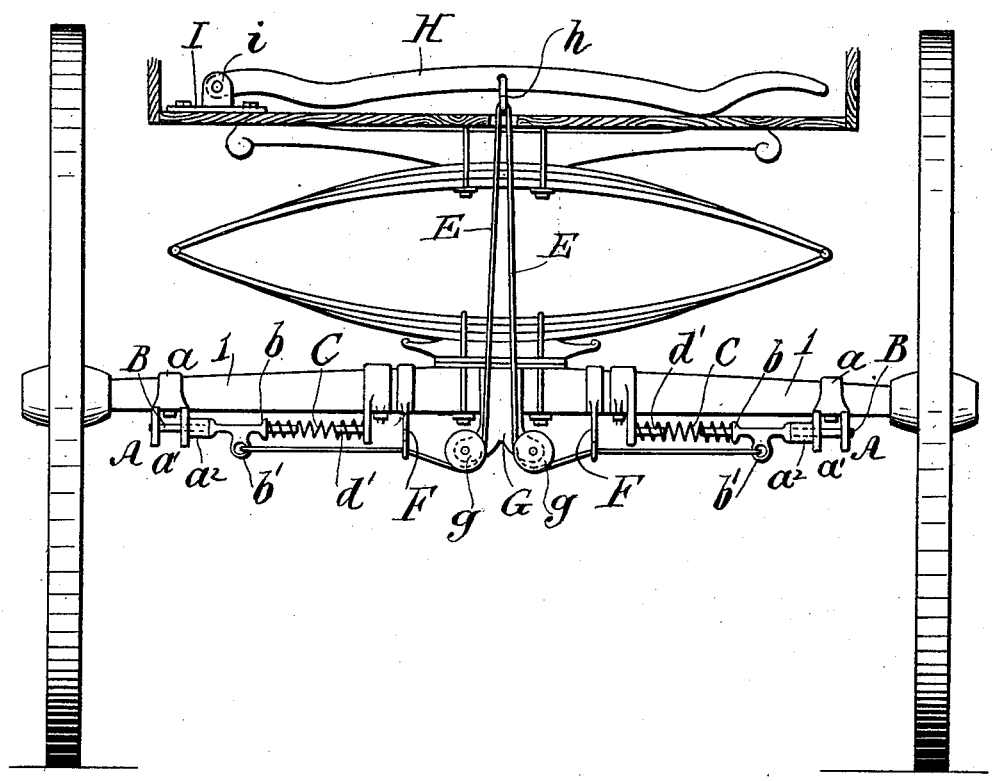
WITNESSES:
INVENTOR
James G. Lamb
BY
ATTORNEYS

UNITED STATES PATENT OFFICE.

JAMES G. LAMB, OF JOHNSTOWN, PENNSYLVANIA.

THILL OR POLE COUPLING FOR VEHICLES.

SPECIFICATION forming part of Letters Patent No. 660,256, dated October 23, 1900.

Application filed January 20, 1900. Serial No. 2,105. (No model.)

*To all whom it may concern:*

Be it known that I, JAMES G. LAMB, a citizen of the United States, and a resident of Johnstown, county of Cambria, and State of Pennsylvania, have invented certain new and useful Improvements in Shaft or Pole Coupling Devices for Vehicles, of which the following is a specification, reference being had to the accompanying drawing, forming a part thereof, in which similar letters of reference indicate corresponding parts.

This invention relates to improvements in shaft or pole coupling devices for vehicles, and embodies an efficient means for coupling the shafts or pole in such a manner that they may be instantly detached when occasion demands, the object of the invention being to detach runaway horses from the vehicle to avoid accidents.

The device is simple in construction, durable, and inexpensive, and it is susceptible of attachment to any ordinary vehicle of the class adapted to be drawn by horses.

The invention will be hereinafter fully described, and specifically set forth in the annexed claims.

In the accompanying drawing, forming part of this specification, the invention is illustrated by a single view, in front elevation, of the running-gear of a vehicle and a part of the body, which is shown in cross-sectional elevation.

In the practice of my invention I employ ordinary shaft-couplings A, embodying clips $a$ and jaws $a'$, each coupling being provided with an integral inwardly-extended sleeve or guide $a'$. These sleeves engage the sliding spring-actuated coupling pins or bolts B, which connect the shafts or pole in the manner common to all draft-vehicles, and said bolts are maintained in normally-locked position by means of spiral springs C, which engage the respective inner ends of the said bolts and bear against collars $b$ thereof, the inner ends of the said springs engaging studs $d$, which form part of depending arms $d$ of clips D, which are secured to the vehicle-axle $l$. Each bolt B is provided with an extended eye $b'$ for connection with the respective ends of a draft string, rope, or chain E, adapted for sliding the bolts for releasing the shafts or pole, as will be hereinafter described.

This rope passes through guides F and thence under pulleys $g$, which are carried by a two-armed hanger G, secured centrally of the axle $l$. From these pulleys the rope is looped upwardly and connected with a ring $h$, which passes through the central portion of an operating-lever H, which is fulcrumed to an upright $i$, forming part of a plate I, said plate being bolted to the vehicle-body.

In the operation and use of the invention the shafts are normally maintained in a securely-locked position within the couplings by means of the spring-actuated bolts B; but when it is desired to detach the shafts—for instance, to release a runaway horse from the vehicle—it is simply necessary to pull upwardly on the lever H and communicate sliding motion to the bolts B until their respective outer ends are within the sleeves $a'$ of the couplings, whereby the shafts may be readily uncoupled by the pulling action of the horse, and the vehicle can be stopped by means of ordinary brake attachments to avoid accidents by collision. To prevent the shafts from dropping to the ground after they are detached, suspending-straps may be employed for attachment to the harness.

Thus the invention provides an efficient means for saving lives, and at the same time it can be employed for readily coupling and uncoupling shafts or poles for purposes of common utility.

Having thus described my invention, what I claim as new, and desire to secure by Letters Patent, is—

1. As a horse-detaching device, the combination with thill-couplings having spring-actuated bolts, of a lever having a chain or rope attached which is secured at its respective ends to the spring-actuated bolts of the thill-couplings, and pulleys guiding the said rope; the said lever adapted to be fulcrumed to the floor of a vehicle and the rope extending downwardly therefrom.

2. As a horse-detaching device the combination with a vehicle provided with thill-couplings having normally-closed spring-actuated bolts, of a rope or chain secured at its respective ends to the bolts of the said thill-couplings and looped upwardly through the floor of the vehicle, and pulleys guiding the said rope, and an arched lever fulcrumed to the floor of the vehicle and connected to the loop of the said rope, whereby swinging movement of the lever will simultaneously draw the bolts and release the thills, substantially as shown and described.

In testimony that I claim the foregoing as my invention I have signed my name, in presence of two witnesses, this 13th day of January, 1900.

JAMES G. LAMB.

Witnesses:
 FRED BLOCH,
 GEORGE C. FISHER.